INVENTOR
NELSON MABERY
BY
HARRIS, KIECH, FOSTER & HARRIS
FOR THE FIRM
ATTORNEYS

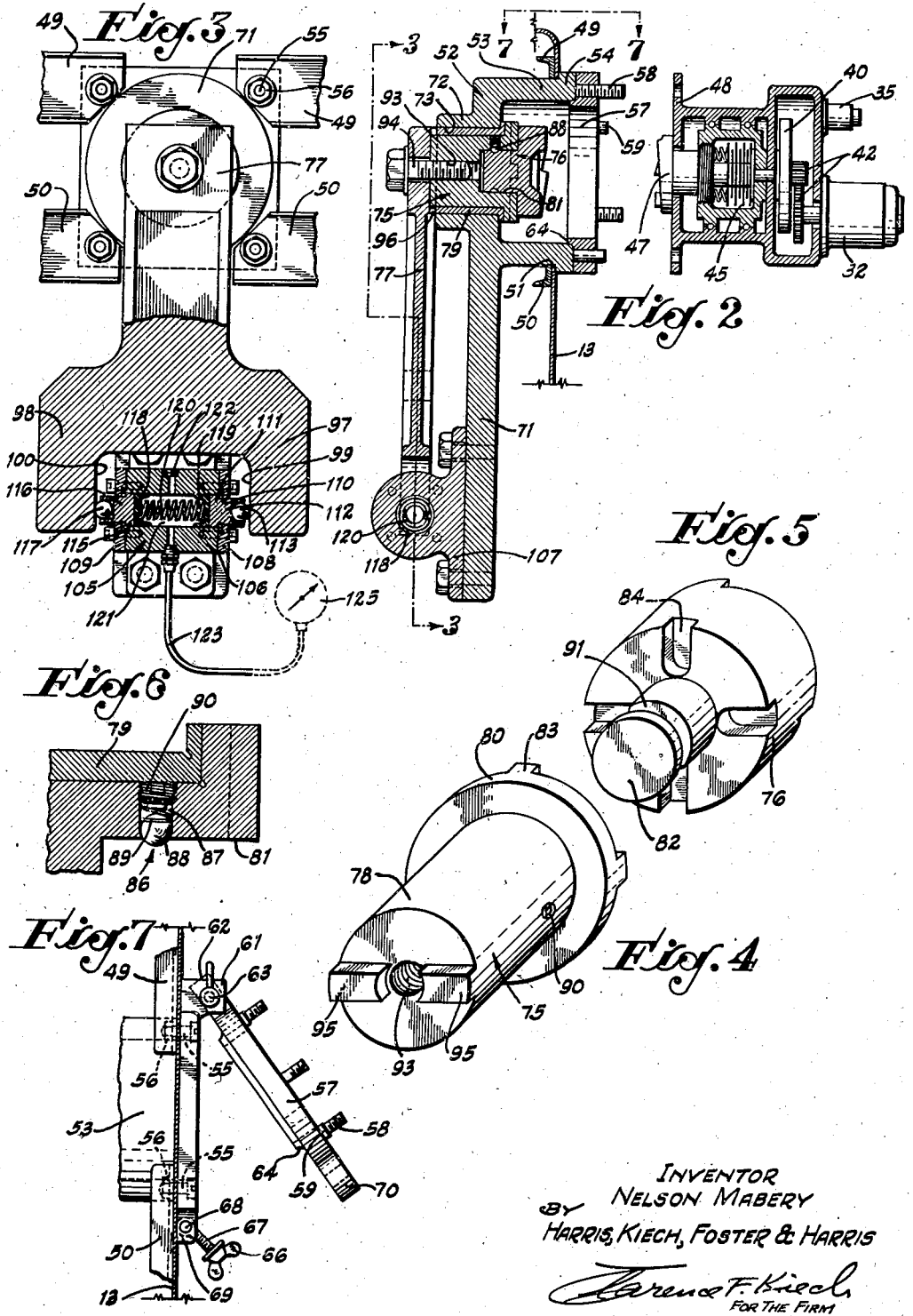
Aug. 7, 1945.  N. MABERY  2,381,549
STARTER TESTER
Filed Feb. 1, 1944    2 Sheets-Sheet 2
INVENTOR
NELSON MABERY
BY HARRIS, KIECH, FOSTER & HARRIS
FOR THE FIRM
ATTORNEYS Patented Aug. 7, 1945

2,381,549

UNITED STATES PATENT OFFICE 2,381,549

STARTER TESTER

Nelson Mabery, Glendale, Calif., assignor to Airplane Manufacturing & Supply Corporation, Glendale, Calif., a corporation of California Application February 1, 1944, Serial No. 520,630

14 Claims. (Cl. 73—118)

My invention relates to torque-testing devices and, more particularly, to an apparatus for testing the torque output of inertia-type starters for airplane engines. As will be later pointed out, it is adapted also to the testing of other equipment.

Inertia starters usually include an energy-storing flywheel which is brought up to speed by use of manually-operated gear means or, more commonly, by an electric motor. To crank the engine, the free-running flywheel is connected to the engine through a clutch and the energy stored in the flywheel is sufficient to turn the engine one or more revolutions to effect starting.

The clutch of such a starter is subject to considerable wear and should be tested from time to time. One way of testing such a clutch is to cause it to dissipate substantially all of the kinetic energy stored in the flywheel. For example, engaging the clutch against a stationary load will cause dissipation of the flywheel-stored energy in a time varying from a fraction of a second to a few seconds, and the torque applied to such a stationary load is a measure of the torque output of the starter when connected to a movable load, such as an internal combustion engine. Such torque applied to a stationary load is also a measure of the condition of the clutch and of the initial speed of the flywheel. In addition to the above clutch-slippage test, it is often desirable to know the current drawn by the motor in bringing the flywheel up to speed.

It is an object of the present invention to provide a testing apparatus adaptable to the testing of such impulse starters, as well as to the torque-output testing of various other devices. For example, the invention is readily usable for testing the locked torque of electric motors, such as high-torque landing gear motors.

The preferred embodiment of the invention is a self-container test unit capable of simulating adverse operating conditions for the starter, and testing the performance of the starter under such adverse conditions. It provides interchangeable jaws for the testing of right-hand-rotation and left-hand-rotation starters produced by the various manufacturers, and provides a novel adapter construction whereby the various makes of starters can be quickly and easily connected to the test unit. Also, such preferred embodiment provides a control panel including control and measuring equipment for operating and testing the starter or other device, and provides a novel mounting for the test equipment, as well as a novel unitary structure for making the torque measurements. The provision of these features, singly or combined, is within the objects of the present invention.

It is also an important object of the invention to provide a hydraulic torque-measuring device and, preferably, a double-acting hydraulic unit capable of interchangeably testing right-hand and left-hand-rotation devices without change in the hydraulic connections or zone of placement of the device being tested. In accomplishing this, I provide a double-piston system measuring right-hand or left-hand torque by use of two arms or members respectively actuating the pistons, the hydraulic pressure between the pistons increasing in proportion to torque and being applied to a pressure-responsive device, such as a pressure gauge. It is an object of the invention to provide a novel double-piston system of this type, and also to provide test equipment indicating not only the instantaneous torque output but also the maximum torque or "break-out" torque of a clutch on a device such as an inertia starter.

Other objects and advantages of the invention will be apparent to those skilled in the art from the following description of a preferred embodiment of the invention, exemplified as testing a motor-driven inertia starter.

Referring to the drawings:

Figure 2 is a vertical sectional view, taken along the line 2—2 of Figure 1 showing a part of the testing apparatus in section and showing diagrammatically the elements of the starter;

Figure 3 is a rear view, partially in section, of the torque-testing structure, taken along the line 3—3 of Figure 2;

Figure 4 is a perspective view of the jaw holder of the invention;

Figure 5 is a perspective view of one type of jaw insertable into the jaw holder of Figure 4;

Figure 6 is a fragmentary sectional view of the spring catch for holding the jaw in the jaw holder;

Figure 7 is a top fragmentary view, taken as indicated by the line 7—7 of Figure 2 and showing the adapter member swung into open position.

Figure 1:
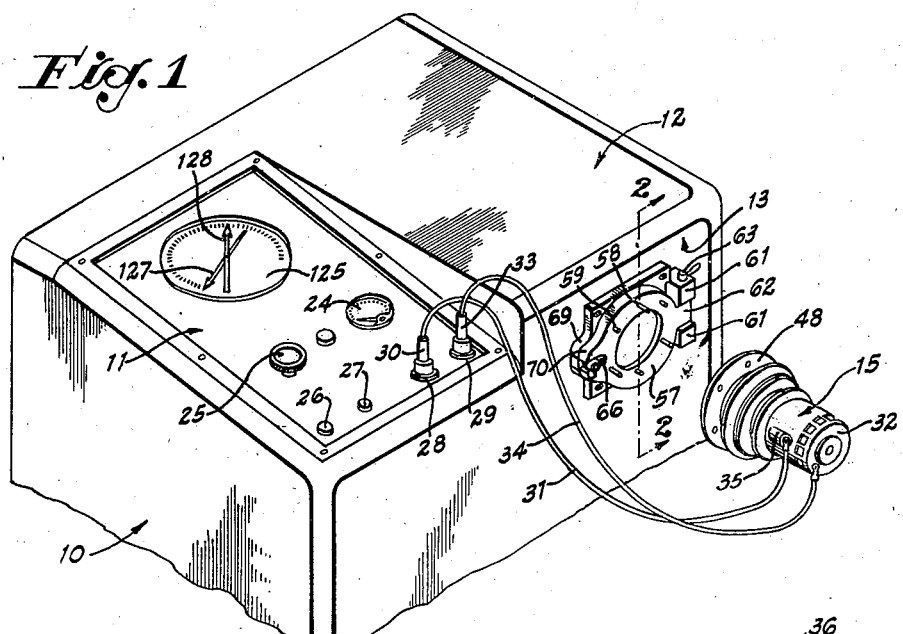
Figure 1 is a perspective view showing the upper portion of the cabinet and its related equipment, and showing a typical inertia starter just before attachment to the invention.

Referring particularly to Figure 1, the invention is housed in a cabinet 10 formed of sheet metal and having a suitable internal framework, not shown in detail. The cabinet 10 provides a sloping control panel 11 and a deck 12, as well as a starter-mounting panel 13 adapted to receive a starter 15 which is to be tested.

Figure 8:
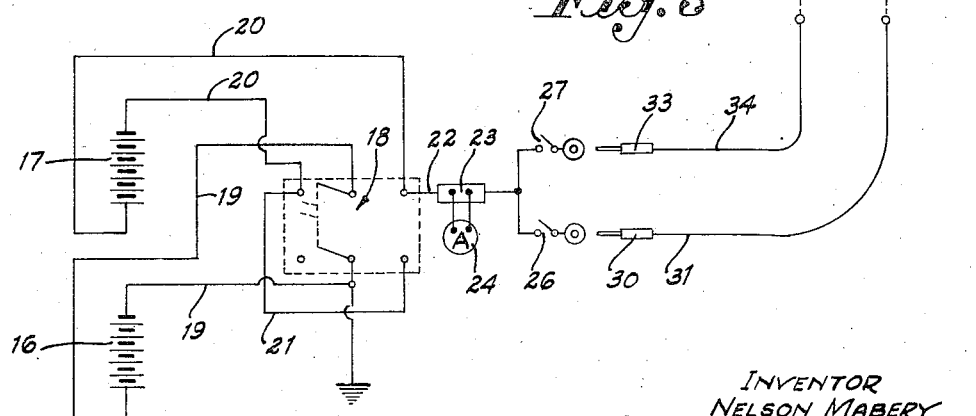
Figure 8 is a wiring diagram of one embodiment of the invention.

Inside the cabinet 10 is a source of potential suitable for operating the starter 15. Preferably, this is an adjustable-potential direct-current source to provide for testing various starters and may be either a plurality of batteries or a rectifier unit. As shown in Figure 8, this source includes two 12-volt storage batteries 16 and 17, the former being connected across the central contacts of a series-parallel switch 18 by conductors 19, one of which is grounded to the cabinet 10 as shown. The battery 17 is connected between two end terminals of the switch 18 by conductors 20 and a conductor 21 joins one of these end terminals to a diagonally-opposite end terminal, while a conductor 22 is connected to the other end terminal and includes a shunt 23 of a panel-mounted ammeter 24. The batteries 16 and 17 are connected in parallel between the conductor 22 and ground when the switch 18 is thrown to the right, and are connected in series therebetween when the switch is thrown to the left. A control knob 25 on the panel 11 is operatively connected to the switch 18 to change the battery connections in this manner.

The conductor 22 is connected to two panel-mounted control switches 26 and 27 of the push-button or other type, and these switches respectively energize jacks 28 and 29. The jack 28 is connectable by plug 30 and flexible conductor 31 to starter motor 32. Similarly, the jack 29 is connectable by plug 33 and flexible conductor 34 to a clutch-engaging solenoid 35 of the starter. The far terminals of the motor 32 and solenoid 35 are connected together by grounded conductor 36. The ammeter 24 is responsive to motor current when the switch 26 is closed and to solenoid current when the switch 27 is closed.

The internal mechanism of a typical starter 15 is suggested, diagrammatically, in Figure 2 to explain the general mode of operation thereof. The motor, when energized, drives a flywheel 40 through gearing 42, storing sufficient kinetic energy in the flywheel to crank the airplane engine when subsequently connected thereto through clutch 45. Energization of solenoid 35 engages the clutch 45 in this type of starter, though, in other types, the clutch 45 is engaged manually. Upon engagement of the clutch, a jaw member 47 of the starter is operatively connected to the flywheel 40 through the clutch and tends to turn. This jaw member 47 comprises a torque member, the torque of which is to be tested, and is suitably journalled in a frame of the starter, shown as including a flange or stationary member 48.

Referring particularly to Figures 2 and 3, the frame of the cabinet 10 includes two upper horizontal channel members 49 and two lower channel members 50 respectively adjacent the upper and lower portions of a circular opening 51 in the panel 13 of the cabinet. Rigidly attached to these channel members 49, 50 is a bracket, generally indicated by the numeral 52, preferably formed of cast metal, this bracket providing a tubular portion 53 extending rearwardly through the opening 51 and a square flange 54 in front of the panel 13. As best shown in Figures 1 and 7, this square flange 54 is bolted to the channel members 49, 50, with the panel therebetween, by four bolts 55 with heads countersunk in the face of the flange 54 and with nuts 56 pressing against the rear of the channel members 49, 50.

This square flange 54 forms an adapter mounting member to which is removably connected an adapter member 57 to which, in turn, the starter 15 is connectable. The adapter member 57 is preferably in the form of a ring and is designed with reference to a particular type, make, or size of starter to be tested. Three adapter members 57 are sufficient to accommodate all starters currently used.

Means is provided for detachably connecting a starter to the adapter member. For example, in Figure 2, the adapter member 57 provides a circular series of studs, including three threaded studs 58 with intervening short unthreaded studs or dowel pins 59. The threaded and shorter studs are positioned to extend respectively through and into corresponding openings of the flange 48 of the starter. Attachment is effected by nuts threaded to the studs 58 and engaging the forward face of the flange 48.

The preferred method of detachably connecting the adapter member 57 to the square flange 54 is by use of a pivot means, best shown in Figures 1 and 7. As illustrated, a pair of bosses 61 is formed integrally with or secured to the flange 54 at vertically-spaced positions to receive a tongue 62 of the adapter member 57. These bosses and the tongue 62 are bored to receive a removable pin 63, about which the adapter member 57 may pivot to move from a position substantially at right angles to the flange 54 through the position shown in Figure 7 and to the closed position in which the adapter member is in surface contact with the forward face of the flange 54. The adapter member 57 provides an annular neck 64 entering the interior of the tubular portion 53 to act as a centering means when the adapter member is in closed position. To retain the adapter member 57 in closed position, I provide a wing nut 66 threaded to a bolt 67 pivoted on a vertical pin 68 carried by arms 69 of the flange 54, as best shown in Figures 1 and 7. When the adapter member 57 is in closed position, the bolt 67 may be pivoted to extend in a space between sidewardly-extending arms 70 of the adapter member 57, after which the wing nut 66 can be tightened to rigidify the structure.

The rear end of the tubular portion 53 carries a downwardly-extending bracket arm 71 which, at its upper end, provides a rearwardly-extending collar 72 having an opening 73 axially aligned with the jaw member 47 of the starter 15.

The bracket 52, with its attached flange 54, tubular portion 53, and bracket arm 71 comprises a stationary structure detachably connected to the frame or stationary member of the starter 15. The invention also provides a movable structure, such as the torque arm structure to be presently described, for detachable connection to the movable torque member, e. g., the jaw member 47 of the starter undergoing test. The preferred torque arm structure is pivoted to the stationary structure and is shown as including, generally stated, a jaw holder 75, a removable jaw 76, and a torque arm 77 rigidly connected together.

The jaw holder 75 is best shown in Figures 2 and 4. Preferably, it includes a cylindrical body 78 surrounded by a flanged sleeve 79 journalled in the opening 73 of the collar 72. The forward end of the body 78 carries a flange 80 engaging the flange of the sleeve 79.

The jaw 76 is one of a plurality of such jaws, respectively designed for connection with the jaw members of the various starters to be tested. It is desirable that this jaw 76 be removably connected to the jaw holder 75 to be easily replaceable. In accomplishing this result, the forward portion of the body 78 of the jaw holder 75 provides a circular opening 81 to receive a circular head 82 extending from the jaw, as best shown in Figures 2 and 5. To prevent relative rotation between the jaw 76 and the jaw holder 75, the flange 80 provides a plurality of forwardly-extending radial arms 83 paired with, and received by, corresponding radial grooves 84 of the jaw 76.

Preferably, means is provided to retain the jaw resiliently in position until removal or replacement is desired. For the purpose, a spring catch means, indicated generally by the numeral 86, is employed, a preferred structure being shown in Figure 6. As there shown, the body 78 provides a chamber 87 in which is movably positioned a detent means shown as comprising a ball 88 resiliently urged toward the circular head 82 by a spring 89 compressed by a plug 90. The innermost end of the chamber 87 provides an annular ledge determining the maximum inward position of the ball 88. As the jaw 76 is inserted, the ball 88 is urged resiliently into an annular groove 91 of the circular head 82.

The rear end of the jaw holder 78 is rigidly connected to the torque arm 77 by means best shown in Figures 2 and 4. As there shown, the upper end of the torque arm 77 provides an opening aligned with a threaded opening 93 of the jaw holder 75 to receive a clamping bolt 94. In addition, auxiliary means is preferably provided for locking the jaw holder 75 and the torque arm 77 together. The preferred embodiment includes a pair of radial arms 95 extending rearwardly from the body 78 of the jaw holder 75 to extend into corresponding radial slots 96 cut into the forward face of the torque arm 77, as best shown in Figure 2.

The lower end of the torque arm 77 is bifurcated to provide permanently-spaced arms or contact members 97 and 98 providing contact faces 99 and 100 spaced apart a sufficient distance to accommodate a double-acting, torque-responsive hydraulic unit, indicated generally by the numeral 105.

As best shown in Figures 2 and 3, this hydraulic unit includes a cylinder 106 providing a base 107 bolted to the lower end of the torque arm 71. Opposite ends of the cylinder 106 are closed by heads 108 and 109. The head 108, for example, provides an opening 110 and the corresponding end of the cylinder 106 carries a piston 111 having an actuating means, such as a pin 112, extending through the opening 110. The outer end of this pin provides a cavity in which is disposed a ball bearing 113 engaging the contact face 99 of the contact member 97. Similarly, the other end of the cylinder contains a piston 115 carrying a pin 116 extending through the opening of the head 109 and carrying a ball bearing 117 engaging the contact face 100 of the contact member 98. The pistons 111 and 115 are sealed with respect to the cylinder 106 by piston caps 118 and 119, usually formed of rubber, leather, etc. A compression spring 120 urges these piston caps and their associated pistons outward. It will be understood that any suitable means can be employed for sealing the pistons with respect to the cylinder.

Between the piston caps 118 and 119 is a space 121 adapted to be completely filled with a liquid through an opening closed by a filler plug 122 at the extreme upper end of the cylinder. The lower end of the space 121 is connected by hydraulic line 123 to a pressure gauge 125, preferably mounted on the sloping control panel 11. A quick-acting pressure gauge is preferred, desirably of the type having one pointer 127 for indicating instantaneous hydraulic pressures and another pointer 128 of the maximum-indicating type for showing the maximum hydraulic pressure to which the gauge has been subjected in the particular test. Such maximum-indicating gauges are well known in the art, the pointer 128 being frictionally retained in its maximum position until released by a suitable release means, not shown, whereupon it returns to its initial starting point preparatory to the next test.

The operation of the device is as follows. An appropriate jaw 76 is selected to fit the particular jaw member 47 of the starter to be tested, this jaw being inserted in the jaw holder 75. An appropriate adapter member 57, mating with the particular starter to be tested, is then selected and attached to the starter. The adapter member 57 may be connected to the flange 54 before or after attachment of the adapter to the adapter member, this connection requiring merely the insertion of the pin 63. The adapter member 57 is then locked in closed position by use of the wing nut 66, and the selected jaw 76 will then be engaged with the jaw member 47 of the starter undergoing test.

The plugs 30 and 33 are then respectively connected to the motor 32 and clutch-operating solenoid 35, and these plugs are then inserted into the corresponding jacks 28 and 29. The series-parallel switch 18 is moved to select the appropriate rated potential of the starter.

The switch 26 is then manually closed for a time sufficient to bring the motor 32 and the flywheel 40 up to speed. The instantaneous current drawn by the motor can be observed from the ammeter 24. The switch 26 is then opened and the switch 27 immediately closed. This energizes the solenoid 35 and connects the flywheel 40 to the jaw member 47 through the clutch 45 and very quickly dissipates the kinetic energy of the flywheel in the clutch as the jaw member 47 is prevented from turning through more than a very small angle due to the engagement of its teeth with the corresponding teeth of the jaw 76.

However, it will be readily apparent that a very high torque is transmitted to the troque arm 77 when the clutch is engaged. This tends to move one or the other of the contact members 97, 98 into pressural engagement with the ball bearing associated with the corresponding piston. This forces the piston inward and builds up a pressure in the space 121 substantially proportional to the torque applied to the torque arm 77 at any particular instant of time. The torque is directly indicated by the pointer 127 of the pressure gauge 125 and this gauge can be calibrated in terms of torque, e. g., foot pounds. Correspondingly, the pointer 127 will indicate the instantaneous torque and the pointer 128 will follow the pointer 127 to the point of maximum or "break-out" torque of the clutch and will remain at this setting even when the pointer 127 returns to a lower-torque position. The rate at which the flywheel energy is dissipated in the clutch can be determined by the time required for the pointer 127 to return to its "no-torque" position. Any fluctuations in the slippage of the clutch during increase in flywheel speed will be evidenced by a fluctuation in the movement or position of the pointer 127.

In testing those starters in which the clutch is manually engaged, the plug 33 need not be connected to the jack 29. After the flywheel has been brought up to speed and after the switch 26 has been opened, the clutch is manually engaged. The device is also adapted for the testing of manual-type inertia starters in which the flywheel is brought up to speed manually, as by a suitable crank. After this has been done, the clutch is engaged to produce the torque-indicating readings previously mentioned.

One feature of the invention is that various types of starters, whether right-hand-rotation or left-hand-rotation may be tested interchangeably without modification of the test equipment. It is necessary only to select an appropriate right-hand or left-hand jaw 76 and insert it in the jaw holder before the starter is attached or after such attachment by pivoting the starter and adapter member 57 to give access to the space in which the jaw is positioned. The invention will indicate the torque relationships accurately without any necessity for change in hydraulic connections, as will be readily apparent from the fact that the pressure variations in the space 121 can be created by movement either of the piston 111 or the piston 115. In testing right-hand-rotation starters, one of the contact members 97, 98 comes into operation, while in testing left-hand-rotation starters, the other of these contact members comes into play.

It should be noted, also, that the torque of the starter and its reaction force are transmitted respectively to stationary and movable structures without requirement that the frame of the cabinet 10 withstand these forces. In addition, the hinged relationship between the adapter member 57 and the flange 54 is very desirable as permitting turning of the jaw member 47 relative to the jaw 76 even after the starter has been connected to the adapter member 57, thus insuring appropriate meshing between the teeth of this jaw member 47 and jaw 76.

The invention is not limited to the testing of starters. It can be employed in the testing of static torques developed by various other devices that can be connected by use of suitably designed adapter members 57 and a suitably designed jaw 76. For example, it is often desirable to be able to test the locked torque of a motor, in which event the motor casing is connected to a suitable adapter member 57 and the motor shaft to the torque arm 77 through a suitable interlocking jaw connection. The motor can be energized through the jack 28 by closing the switch 26. The invention will simultaneously indicate the current drawn by the motor and the locked torque developed.

Various changes and modifications can be made without departing from the spirit of the invention as defined in the appended claims.

I claim as my invention:

1. In a bi-directional torque-testing apparatus for testing devices such as aircraft starting motors having a stationary member and a movable torque member, the combination of: a stationary structure providing means for detachable connection with said stationary member of said device; a torque arm structure providing means for detachable connection with said movable torque member of said device; means for building up a hydraulic pressure substantially proportional to the torque applied in either direction to said torque arm structure by said device, said means including a double-acting hydraulic unit operatively connected to said structures; and a pressure gauge connected to said hydraulic unit for indicating said hydraulic pressure.

2. In a bi-directional torque-testing apparatus for testing devices such as aircraft starting motors having a stationary member and a movable torque member, the combination of: a bracket arm; a torque arm bi-directionally movable with respect to said bracket arm; means for detachably connecting said bracket arm and said torque arm respectively to said stationary member and said movable torque member of the device to be tested; a cylinder means operatively connected to one of said arms and containing a body of liquid; two pistons within said cylinder means in pressure-transferring relationship with said body of liquid and operatively associated with the other of said arms to increase the pressure on said body of liquid upon movement of said torque arm in either direction; and pressure-responsive means connected to said cylinder means and responsive to such increase in pressure on said body of liquid.

3. In a bi-directional torque-testing apparatus for testing devices such as aircraft starting motors having a stationary member and a movable torque member, the combination of: a bracket arm; a torque arm; means for mounting said torque arm to move bi-directionally with respect to said bracket arm; means for detachably connecting said bracket arm and said torque arm respectively to said stationary member and said movable torque member of said device to be tested; a cylinder connected to one of said arms; two pistons in said cylinder, there being a body of liquid within said cylinder between said pistons, said pistons respectively providing an actuating means extending from said cylinder at opposite ends thereof; spaced contact members carried by the other of said arms in position to respectively contact said actuating means when said torque arm is moved first in one direction and then in the other direction with respect to said bracket for alternate actuation of said pistons to increase the pressure on said body of liquid; and pressure-responsive means connected to said cylinder and responsive to such increase in pressure on said body of liquid.

4. A combination as defined in claim 3, in which said cylinder provides heads at its ends, each head providing an opening, and in which each actuating means includes an actuating member operatively connected to one of said pistons and extending through the opening of the adjacent head to be engaged by one of said spaced contact members.

5. A combination as defined in claim 3, including a ball disposed between each actuating means and its corresponding contact member for transmitting pressure to said actuating means.

6. A combination as defined in claim 3, including a compression spring within said cylinder and urging said pistons away from each other.

7. In an apparatus for testing a device having a stationary member and a movable torque member to produce a change in pressure measurable to determine the torque of such movable torque member, the combination of: a stationary structure; means detachably connected to said stationary structure and adapted for connection with said stationary member of said device; a movable structure journalled with respect to said stationary structure; means detachably connected to said movable structure and adapted for connection with said movable torque member of said device; a cylinder operatively connected to one of said structures; a piston means in said cylinder operatively connected to the other of said structures to move in said cylinder upon relative movement between said structures; and a body of fluid confined by said cylinder and said piston means, relative movement of said piston means and cylinder changing the pressure of said fluid substantially in proportion to the degree of relative movement between said structures.

8. In a torque-testing apparatus for testing devices such as aircraft starting motors having a stationary member and a movable torque member, the combination of: a stationary structure; an adapter member detachably connected to said stationary structure and including means detachably connectable to said stationary member of said device to be tested; a torque arm structure; means for detachably connecting said torque arm structure to said torque member of said device; and a fluid-operated torque-measuring means operatively connected to said stationary structure and said torque arm structure and comprising a cylinder connected to one of said structures, a piston within said cylinder and connected to the other of said structures, and a fluid confined by said cylinder and piston to increase in pressure upon relative movement of said piston and said cylinder occasioned by movement of said torque arm structure relative to said stationary structure.

9. In a torque-testing apparatus for testing devices such as aircraft starting motors having a stationary member and a movable torque member, the combination of: a frame; a bracket including an adapter mounting member and a bracket arm extending to a position on one side of said adapter mounting member; an adapter member connected to said adapter mounting member and detachably connected to said stationary member of said device to be tested; means for rigidly connecting said bracket to said frame; a torque-transmitting element journalled in said bracket; means detachably connecting said torque-transmitting element to said torque member of said device to be tested; a torque arm fixed to said torque-transmitting element and extending along said bracket arm to said position; a hydraulic unit at said position operatively associated with said torque arm and said bracket arm, said hydraulic unit containing a body of liquid and including means for increasing the pressure on said body of liquid in response to movement of said torque arm with respect to said bracket arm; and pressure-responsive means connected to said hydraulic unit and responsive to such increase in pressure on said body of liquid.

10. In a torque-testing apparatus for testing the torque output of a device having a stationary member and a movable torque member providing a jaw member, the combination of: a stationary structure comprising a bracket providing an opening; a jaw holder pivoted in said opening and providing a jaw-receiving cavity; a jaw removably and non-rotatably held in said cavity in position to engage said jaw member of said device; an adapter member removably connected to said bracket and providing means detachably connectable to said stationary member of said device for supporting said device in testing position; a double-acting torque-responsive hydraulic unit providing a cylinder means and a piston means, one of said means being operatively connected to said bracket and the other of said means being operatively connected to said jaw holder, said cylinder means containing a body of liquid in pressure-transferring relation with said piston means; and a hydraulic pressure gauge connected to said body of liquid to indicate the pressure thereof.

11. In an apparatus for testing inertia starters providing a stationary member, a drive means, an energy-storing flywheel connected to said drive means, a jaw member, and a clutch for interconnecting said flywheel and jaw member, the combination of: a cabinet providing a control panel and a starter-mounting panel having an opening; a stationary structure secured to and extending within said cabinet and comprising an adapter mounting member adjacent said opening and a bracket arm secured to said adapter mounting member; an adapter member exterior of said cabinet and providing means for detachably connecting same to said adapter mounting member adjacent said opening and to said stationary member of said starter, said jaw member of said starter extending through said opening; a jaw holder journalled in said stationary structure and providing a jaw-receiving cavity; a jaw removably and non-rotatably secured in said cavity in position to mesh with said jaw member of said starter; a torque arm secured to said jaw holder; a hydraulic unit operatively connected to said torque arm and said bracket arm and including means for developing a hydraulic pressure proportional to the torque applied to said jaw holder by said jaw member of said starter when said clutch is engaged; a pressure gauge mounted on said control panel; and means for delivering said hydraulic pressure to said pressure gauge.

12. In a torque-testing apparatus for testing devices such as aircraft starting motors having a stationary member and a movable torque member, the combination of: an adapter mounting member providing an opening; an adapter member providing means for detachably connecting same to said stationary member of said device to be tested; hinge means for pivotally connecting said adapter member to said adapter mounting member to swing said movable torque member of said device into alignment with said opening when said adapter member is adjacent said adapter mounting member; a jaw aligned with said opening and positioned to be engaged by said torque member of said device when said adapter member is pivoted to lie adjacent said adapter mounting member; means for locking said adapter member and said adapter mounting member together with said torque member engaging said jaw; and torque-measuring means operatively connected to said adapter mounting member and said jaw.

13. In a torque-testing apparatus for testing devices such as aircraft starting motors having a stationary member and a movable torque member, the combination of: an adapter mounting member providing an opening; an adapter member providing means for detachably connecting same to said stationary member of said device to be tested; hinge means for pivotally connecting said adapter member to said adapter mounting member to swing said movable torque member of said device into alignment with said opening when said adapter member is adjacent said adapter mounting member, said hinge means including a removable hinge pin for detachably connecting said adapter member to said adapter mounting member; a jaw aligned with said opening and positioned to be engaged by said torque member of said device when said adapter member is pivoted to lie adjacent said adapter mounting member; means for locking said adapter member and said adapter mounting member together with said torque member engaging said jaw; and torque-measuring means operatively connected to said adapter mounting member and said jaw.

14. In a bi-directional torque-testing apparatus for testing devices such as aircraft starting motors having a stationary member, a movable torque member, a drive means, and an engageable clutch operatively connecting said drive means and said torque member, to determine initial and slippage torques of said clutch, the combination of: a stationary structure providing means for detachable connection with said stationary member of said device; a torque arm structure providing means for detachable connection with said movable torque member of said device; means for building up a hydraulic pressure substantially proportional to the torque applied in either direction to said torque arm by said device, said means including a double-acting hydraulic unit operatively connected to said structures; and a pressure gauge connected to said hydraulic unit and including means for indicating instantaneous hydraulic pressure to indicate slippage torque of said clutch and for indicating maximum hydraulic pressure in said hydraulic unit to indicate initial torque of said clutch.

NELSON MABERY.